(12) United States Patent
King (10) Patent No.: US 8,160,436 B2
(45) Date of Patent: Apr. 17, 2012

(54) SYSTEM AND METHOD FOR RELAY OF PULSED LIGHT BY INTERMITTENT RADIO FOR CAMERA FLASH

(76) Inventor: Kevin James King, Vancouver, WA (US)

(*) Notice: Subject to any disclaimer, the term of this patent is extended or adjusted under 35 U.S.C. 154(b) by 0 days.

(21) Appl. No.: 12/636,735

(22) Filed: Dec. 12, 2009

(65) Prior Publication Data

US 2010/0209089 A1 Aug. 19, 2010

Related U.S. Application Data

(63) Continuation-in-part of application No. 12/284,629, filed on Sep. 24, 2008.

(60) Provisional application No. 60/974,790, filed on Sep. 24, 2007.

(51) Int. Cl.
*G03B 17/00* (2006.01)
(52) U.S. Cl. .......................................... 396/56; 396/171
(58) Field of Classification Search ............... 396/56–59
See application file for complete search history.

(56) References Cited

U.S. PATENT DOCUMENTS

| | | | | |
|---|---|---|---|---|
| 5,283,610 | A * | 2/1994 | Sasaki ............................ | 396/57 |
| 6,404,987 | B1 * | 6/2002 | Fukui ............................. | 396/56 |
| 6,987,931 | B2 * | 1/2006 | Iwasaki ......................... | 396/157 |
| 7,057,174 | B1 * | 6/2006 | Hopper et al. ............... | 250/338.4 |
| 7,698,526 | B2 * | 4/2010 | Frank et al. ................... | 711/170 |
| 7,885,533 | B2 * | 2/2011 | Clark ............................ | 396/198 |
| 2002/0009296 | A1 * | 1/2002 | Shaper et al. ................. | 396/56 |
| 2002/0171741 | A1 * | 11/2002 | Tonkin et al. ............... | 348/211.3 |
| 2006/0203925 | A1 * | 9/2006 | Pirooz et al. ................. | 375/260 |
| 2007/0070206 | A1 * | 3/2007 | Clark ........................ | 348/207.99 |
| 2008/0298792 | A1 * | 12/2008 | Clark ............................ | 396/56 |
| 2009/0015654 | A1 * | 1/2009 | Hayashi ..................... | 348/14.02 |
| 2009/0129765 | A1 * | 5/2009 | King ............................. | 396/56 |
| 2010/0008658 | A1 * | 1/2010 | King ............................. | 396/56 |
| 2010/0209089 | A1 * | 8/2010 | King ............................. | 396/56 |
| 2010/0316364 | A1 * | 12/2010 | Clark ............................ | 396/57 |

OTHER PUBLICATIONS

Texas Instruments Data Sheet for Radio Module CC1101, obtained from http://focus.ti.com/lit/ds/swrs061f/swrs061f.pdf on Feb. 3, 2011; see pp. 95-96 of Data Sheet for document history dating to Apr. 16, 2007.*

* cited by examiner

*Primary Examiner* — Clayton E Laballe
*Assistant Examiner* — Bret Adams (57) ABSTRACT

Methods and systems to relay short duration coded pulses of light emitted by a first flash device to a second flash device, which may be remote, using radio signals, wherein radio signals comprise data representative of short duration coded pulses of light from the first flash device which may comprise one or more binary commands and/or activation signals emitted by the first flash device. A first radio communication device may sense coded pulses of light from a first flash device and in response transmit radio signals representative of the coded pulses of light, and may subsequently stop transmitting radio signals following the transmission of radio signals representative of the coded pulses of light. A second radio communication device may receive the transmitted radio signals from the first radio communication device and may cause a light element comprised of the second radio communication device to emit coded pulses of light to a second flash device wherein the coded pulses of light to the second flash device may be substantially representative of the coded pulses of light emitted by the first flash device.

20 Claims, 5 Drawing Sheets

SYSTEM AND METHOD FOR RELAY OF PULSED LIGHT BY INTERMITTENT RADIO FOR CAMERA FLASH

CROSS REFERENCES TO RELATED APPLICATIONS

This application claims benefit as a Continuation-In-Part application and claims the benefit of U.S. patent application Ser. No. 12/284,629 filed Sep. 24, 2008 which claims the benefit of U.S. Provisional Patent Application No. 60/974,790, filed Sep. 24, 2007. This application incorporates the disclosure of U.S. patent application Ser. No. 12/284,629 and U.S. Provisional Patent Application No. 60/974,790 by reference.

SUMMARY OF THE INVENTION

In various representative aspects, the present invention includes a radio transmitter coupled to a camera or a first flash device of a camera and a radio receiver coupled to a second flash device, which may be remote. In accordance with an exemplary embodiment, a system to wirelessly actuate a second flash device may comprise: a first radio communication device coupled to a first flash device of a camera wherein the first flash device of the camera communicates instructions to a second flash device which may be remote, and wherein the communicated instructions of the first flash device may comprise coded or timed pulses of light which may represent a binary coded instruction, and wherein the first radio communication device coupled to the first flash device is able to detect the coded pulses of light from the first flash device, or a characteristic electromagnetic phenomenon which may be associated with the production of coded pulses of light from the first flash device, and wherein the first radio communication device transmits radio signals which may be representative of the coded pulses of light from the first flash device, and wherein a second radio communication device which may comprise a radio receiver coupled to a second flash device which may be remote receives the radio signals transmitted by the first radio communication device, and wherein the second radio communication device produces coded pulses of light substantially representative of the coded pulses of light produced by the first flash device such that the substantially representative pulses of light are perceptible to a light signal receiver of the second flash device.

Furthermore, in accordance with an exemplary embodiment a first radio communication device may transmit radio signals substantially during, following, or in response to the production of coded pulses of light from a first flash device, and may not transmit radio signals substantially during periods of time when no coded pulses of light are produced from the first flash device.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures may be illustrated for simplicity and clarity and have not necessarily been rendered according to any particular sequence. For example, steps that may be performed concurrently or in different order may be illustrated in the figures to help improve understanding of embodiments of the present invention.

DETAILED DESCRIPTION OF EXEMPLARY EMBODIMENTS

Intro

The present invention may be described herein in terms of functional block components and various processing steps. Such functional blocks may be realized by any number of hardware or software components configured to perform the specific functions and achieve the various results. For example, the present invention may employ various cameras, flash devices, radio transmitters, radio receivers, as well as any software to provide functionality and interconnectivity between such cameras, flash devices, radio transmitters, and radio receivers.

In accordance with various exemplary embodiments, cameras for example, may comprise any of still and/or video graphic devices that may capture images in any manner, for example digitally, by film, or any other manner now known or developed in the future that may benefit from the present invention. The present invention may further employ various flash devices, for example, wireless flash devices, strobe light devices, synchronous flash devices, hardwired flash devices, etc. Exemplary flash devices may comprise a single flash device, a plurality of flash devices, coordinated flash devices, various light frequency flash devices, integral flash devices, and the like. Exemplary flash devices may provide flashes comprising various intensity, duration, timing, color, etc, which may be produced by any example of lighting element for example xenon tubes, light emitting diodes, or any light emission technology developed in the future. With respect to radio transmitter and radio receivers, the present invention may employ any now known or future developed transmitter/receiver components, and the radio transmitters and receivers may be configured to operate over a single radio frequency, multiple radio frequencies, as well as any other electromagnetic frequency outside of the typical "radio" band. The transmitter/receiver components may function on any one or combination of wavelength, wave type (square wave, s-wave, etc.), amplitude, modulation, frequency deviation, frequency bandwidth, period, power, range, and any other like electromagnetic wave characteristics. Moreover, the radio transmitter may also comprise radio receiving capabilities and may be termed "radio transceiver" capable of both sending and receiving radio signals, and similarly the radio receiver may also comprise radio transmission capabilities and may be termed "radio transceiver" capable of both receiving and sending radio signals.

Thus, the various components may carry out a variety of functions, and in addition, the present invention may be practiced among any number of general environments, for example, still photography, video graphy, high speed photography, portrait imaging, landscape imaging, etc. The system described may be merely one exemplary application for the invention, and the present invention may employ any number of conventional techniques for coordinating a remote flash device and a camera.

Various representative implementations of the present invention may be applied to any system for a camera to communicate with a remote flash device, or for a flash device of a camera to communicate with a remote flash device, or for a flash device coupled to a camera to communicate with a remote flash device.

Figure 1:
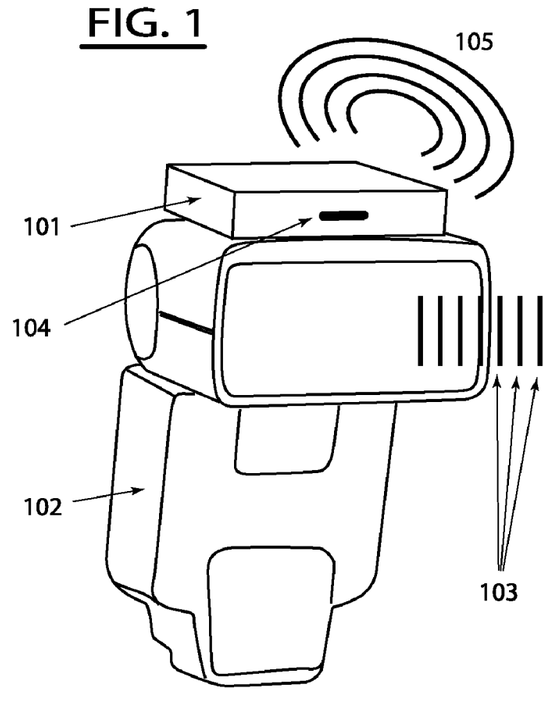
FIG. 1 representatively illustrates a perspective view of a master flash device coupled to an exemplary first radio communication device.

Turning now to FIG. 1, in accordance with an exemplary embodiment, the present invention may comprise a first radio communication device 101 ("transmitter unit") which may be coupled to a flash device 102 or located in the proximity of a flash device 102. The transmitter unit 101 may be alternately coupled to or located proximate to a flash device comprised within a camera, or as a "pop-up" type flash device which may be retractably or permanently coupled to a portion of a camera. A flash device 102 (which may also be termed "master device" or "source device") may be coupled to a camera via a connector of the flash device 102 and may exchange signals with the camera (not pictured). The flash device 102 may produce short duration pulses of light 103 ("coded pulses of light") which may comprise a coded signal, which may be representative of a binary instruction. The pulses of light 103 may be intended to control, prepare, operate, or otherwise communicate with a second flash device 201 (which may also be termed "slave device") which may be remote. A transmitter unit 101 may comprise a sensing element 104 (and may also be represented in the block diagram of FIG. 3 as 303) with any appropriate associated circuitry which may be perceptible to the pulses of light 103, or may be perceptible to an electromagnetic phenomenon associated with or indicative of the production of pulses of light 103 by the flash device 102. The transmitter unit 101 may comprise a radio signal transmitter 302 (which may also be termed "radio transmitter") and an antenna element 304 (together, in whole, or in part "transmitter module") for transmitting radio signals 105, wherein radio signals 105 may comprise signals representative of the pulses of light 103 and/or a binary instruction of which the pulses of light 103 may be representative.

Figure 2:
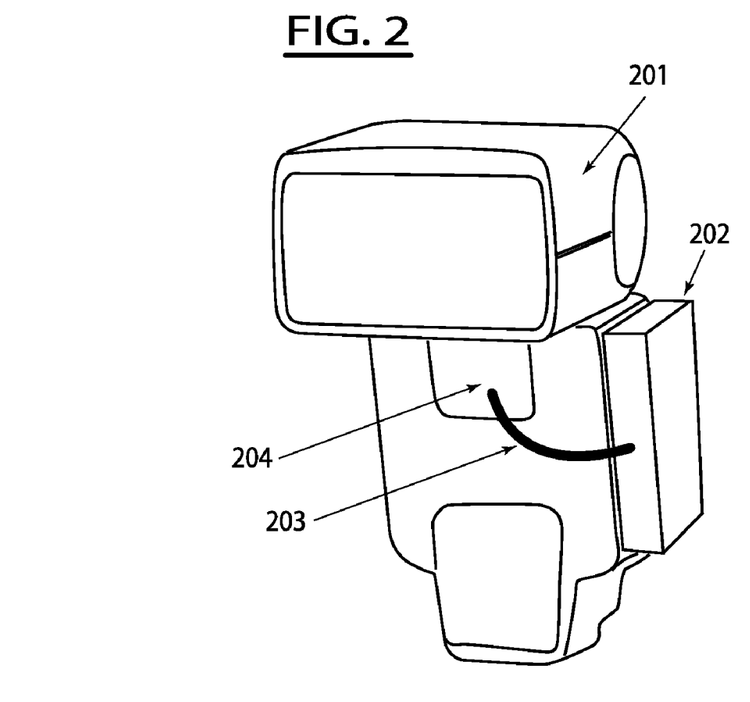
FIG. 2 representatively illustrates a perspective view of a slave flash device coupled to an exemplary at least second radio communication device.
Figure 4:
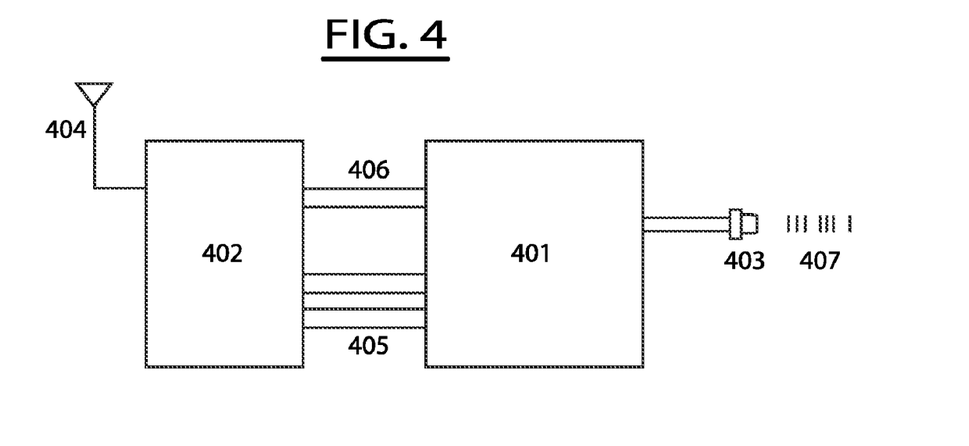
FIG. 4 representatively illustrates a simplified block diagram of an exemplary at least second radio communication device.

A second flash device 201 (slave device) may have coupled thereto or located in the proximity of a second radio communication device 202 ("receiver unit"). A receiver unit 202 may comprise a radio signal receiver 402 (which may also be termed "radio receiver") and an antenna element 404 (together, in whole, or in part "receiver module") for receiving radio signals 105. A receiver unit 202 may comprise a light element 403 such as but not limited to a light emitting diode ("LED") with any appropriate associated circuitry such that the light element 403 may be able to produce pulses of light 407 which may have a characteristic that is substantially similar to a characteristic of the coded pulses of light 103 from a master device 102. A receiver unit 202 may be able to direct pulses of light 407 such that a sensing element 204 of a slave device 201 may be perceptible of pulses of light 407. Optionally, pulses of light 407 may be directed through a light conducting element 203 such as but not limited to a fiber optic tube.

Figure 3:
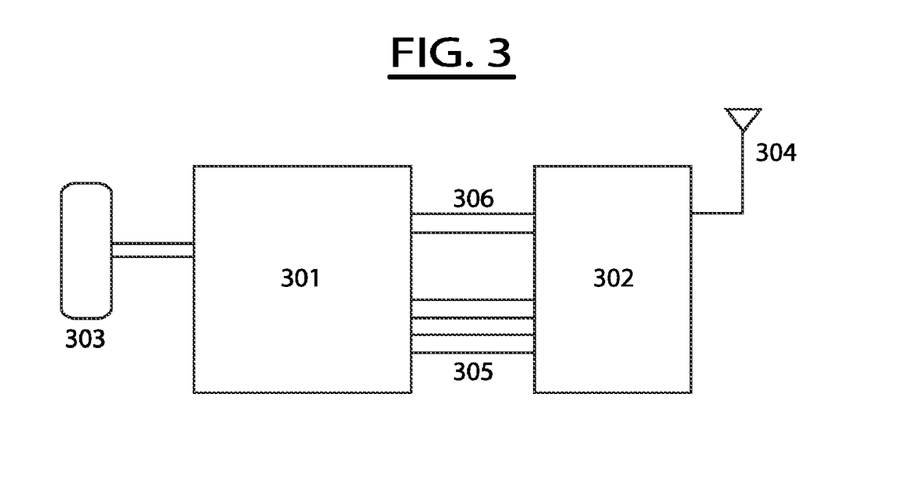
FIG. 3 representatively illustrates a simplified block diagram of an exemplary first radio communication device.

An illustrative simplified block diagram of a transmitter unit 101 may be illustrated in FIG. 3 and described as follows. A sensing element 303 may be electrically connected to a microprocessor ("MCU") 301, or otherwise embodied such that an MCU 301 may be perceptible of a signal from a sensing element 303. An MCU 301 may be embodied by many possible examples of microprocessor or analog or discrete circuitry which may carry out a logical process. An appropriate microprocessor 301 may be a PIC18F45K20 available commercially from Microchip Technology Inc. An MCU 301 may be electrically connected to a radio signal transmitter 302 directly or via an additional circuitry. A radio signal transmitter 302 may be electrically connected to an antenna element 304 directly or via an appropriate circuitry which may comprise various tuning and/or filtering elements. An MCU 301 may have one or more data signal paths to a radio transmitter 302 which may comprise a serial peripheral interface ("SPI") 305, and may also comprise one or more general purpose in/out ("I/O") lines 306 which may convey a variety of signals and/or indications. A SPI interface 305 may be used to send commands to a radio transmitter 302 from an MCU 301, or to query various settings, status, or data of a radio transmitter 302 from by an MCU 301. General I/O lines 306 may provide an interrupt signal to an MCU 301 from a radio transmitter 302. An appropriate radio transmitter 302 may be a CC1101 or CC1150 radio module available commercially from Texas Instruments, Inc.

A sensing element 303 may comprise a variety of possible components and/or circuitry which may generate a signal which may indicate that a pulse of light 103 has been produced by a master device 102, is in the process of being produced by a master device 102, or is likely to be produced by a master device 102 shortly following the signal from sensing element 303. Various exemplary embodiments are discussed. A sensing element 303 may comprise a light sensor which may be for example a phototransistor, photodiode, or other component which may alter an electrical characteristic based on the presence or absence or relative intensity of light. A phototransistor may be coupled to an amplifier, for example, a transistor, which may amplify a light signal. A signal from a phototransistor may be made perceptible to an MCU 301, and furthermore, may be made perceptible such that a signal from a phototransistor may cause an interrupt or indication of a circuitry or peripheral component of an MCU 301.

Alternately and perhaps the best mode of manufacture may be the use of an inductor as a sensing element 303 which may have induced a voltage when exposed to an electromagnetic field. An inductor may have induced an AC current in response to an electromagnetic pulse which may be produced by a xenon tube of a master device 102 each time a light pulse is generated or shortly before a light pulse is generated. An inductor may be electrically connected to a bridge rectifier to produce a positive voltage which may be electrically connected to the base of a transistor such that an output signal of a transistor having a bridge rectifier and an inductor electrically connected may produce a signal perceptible to an MCU 301. It may also be desirable to send a signal from the transistor to a timing element such as a typical "555" type timer which may produce an extended square pulse as a result of an input signal from a transistor. This arrangement of a sensing element 303 (which may protrude to the exterior of a transmitter unit 101 as a sensing element 104) may allow a reliable means of sensing a pulsed light signal (or rather the electromagnetic pulse which may be associated with the production of a pulsed light signal) from a master device 102 without requiring any electrical connection to the master device 102. U.S. Pat. No. 5,436,531 titled "Flash Triggering System" is included in its entirety herein for reference, and may describe in detail a method of inductively sensing the discharge of a flash tube or xenon tube.

An illustrative simplified block diagram of a receiver unit 202 may be illustrated in FIG. 4 and described as follows. A radio signal receiver or radio receiver 402 may have electrically coupled directly or via an intermediate circuitry an antenna element 404 appropriate for the receiving of radio signals from a radio transmitter 302. An appropriate radio receiver 402 may be a CC1101 available commercially from Texas Instruments, Inc. A radio receiver 402 may be electrically connected to an MCU 401 via a variety of possible means including but not limited to a SPI interface 405, general purpose I/O lines 406, or the like. An appropriate microprocessor 401 may be a PIC18F45K20 available commercially from Microchip Technology Inc. A light element 403 such as a light emitting diode ("LED") may be electrically connected to an MCU 401, or may alternately be powered via an amplifier or transistor circuit which may in turn be controlled via an electrical connection to an MCU 401. A light element 403 may produce light of any wavelength, visible or invisible, and may produce infrared light which may be the best mode of manufacture. A light element 403 should be able to be turned on (caused to begin emitting light) and turned off (caused to stop emitting light) as quickly as possible. A turn-on ramp up time of 1 microsecond or less may be desirable and a turn-off ramp down time of 1 microsecond or less may be desirable, and it may be desirable to cause said light element 403 to be able to emit individual pulses lasting between 5 microseconds and 30 microseconds and separated by minimum off cycle durations of 50 microseconds. A capacitor (not pictured) may also be used to help supply temporary surge current to the light element 403 during pulsing which may reach or exceed 100 milliamps. A light element 403 may be directed to emit pulses of light 407 through an opening or window in the exterior enclosure of a receiver unit 202 which may be via a hole or window in the bottom of the receiver unit 202 or any other desired or appropriate surface, or may alternately be directed to emit light into a light conducting material such as but not limited to a fiber optic tube 203, or a sleeve or holder or connector for a fiber optic tube to be inserted.

It should be understood by one skilled in the art of electronic circuit design, embedded systems design, implementing and programming microprocessors, and the use of radio transmitters and/or radio receivers for analog and/or digital radio communications that other components or circuitry not illustrated or not discussed may be required and will know the appropriate selection of parts, use, orientation, and implementation of said parts where appropriate. A transmitter unit 101 and its associated circuitry including but not limited to sensing element 303, MCU 301, radio transmitter 302 and the like may require a power source which may be supplied by a battery and may include appropriate regulation and/or filtering circuitry which may provide an appropriate operating voltage and current. A power source may be a battery or batteries for example, a pair of AAA batteries wired in series, a CR123 battery which may supply about 3 volts DC, etc. An appropriate operating voltage may be 3.0 volts DC with a current sourcing capacity of 100 milliamps to 150 milliamps. It is considered that a transmitter unit 101 may be comprised within a master device 102 or a camera; and may draw operating power via an electrical connection to a port of a master device 102 or camera, or a battery of a master device, a camera, a connector of a master device, or an electrical connection internal to or external to a master device 102 or a camera or any other appropriate power supply source which may be located suitably proximate to a transmitter unit 101. A receiver unit 202 may require a power source similar to that of a transmitter unit 101 and may be provided in a similar way as that previously discussed.

Radio signals transmitted from radio transmitter 302 may be in the frequency range between 902 MHz and 928 MHz, though it may be possible or desirable in certain implementations to transmit radio signals on other frequency bands. It may be possible to transmit radio signals as direct sequence, as spread spectrum, using a single frequency, frequency hopping, etc, as may be appropriate to achieve acceptable data rates, acceptable range, and to comply with appropriate legal radio transmission standards.

Methods of Intermittent Radio Operation

The technology disclosed in U.S. Provisional Application No. 60/974,790 titled "Device to Relay Short Duration Light Pulses via Radio Signal for Camera Flash Operation", and that disclosed in U.S. Non-Provisional application Ser. No. 12/284,629 titled "Method and device to relay short duration light pulses via radio signal for camera flash operation" may describe a system and method by which a pulsed light signal 103 may be representatively transmitted via radio waves 105 by a transmitter unit 101 to a receiver unit 202 such that a pulsed light signal substantially representative of pulsed light signal 103 may be produced as a pulse light signal 407 from a light element 403. The referenced disclosure may describe emitting a first radio signal carrier of a known characteristic from a transmitter unit which is received by a receiver unit, and wherein the sensing of a pulsed light signal 103 by a sensing element 104, 303 may cause a second carrier to be impressed upon the first carrier, and wherein upon receiving the radio signal having two carriers, a circuitry of a receiver unit 202 may be able to subtract out the first known carrier and be left with the second carrier which may be representative of the timing and locations of pulses of light 103 which may be produced by a light element 403 as light pulses 407.

The methods and system of that method involving two carriers while one may be continually broadcast may be improved as described. It may be desirable for two users or photographers to use two different transmitter units to communicate with a single receiver unit. If a transmitter unit continually broadcasts a radio signal (such as a first carrier as that previously described), it may not be possible for a receiver unit to track a received carrier if two transmitter devices are in operation transmitting essentially two different carriers which may be slightly out of time with one another. It may be of benefit if a transmitter unit 101 is only required to transmit radio signals 105 substantially during the time of the production of pulsed light signals 103, and is able to stop broadcasting radio signals 105 substantially shortly following the completion of the production of light signals 103. This may have additional advantages such as but not limited to a reduction in the amount of power required which may result in longer battery life, as well as possibly allowing a transmitter unit to broadcast a radio signal at a greater power level while still meeting legal requirements which may allow the transmission of higher power levels if transmissions or duty cycles are kept to a minimum, etc.

Figure 5:
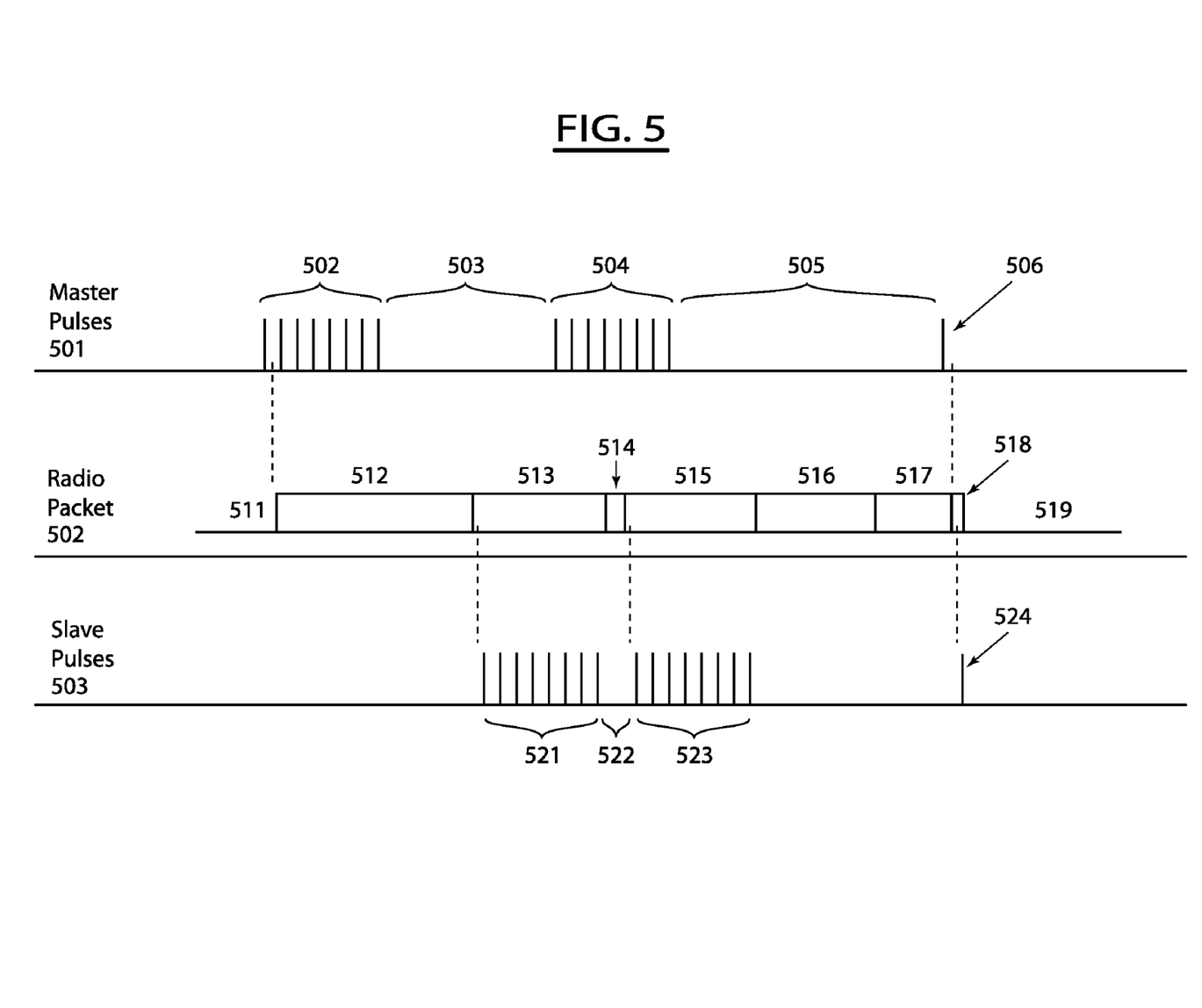
FIG. 5 representatively illustrates a timing plot of signals from a master flash device, a simplified diagram of a radio packet which may be transmitted by a first radio communication device, and signals produced by an at least second radio communication device.
Figure 6:
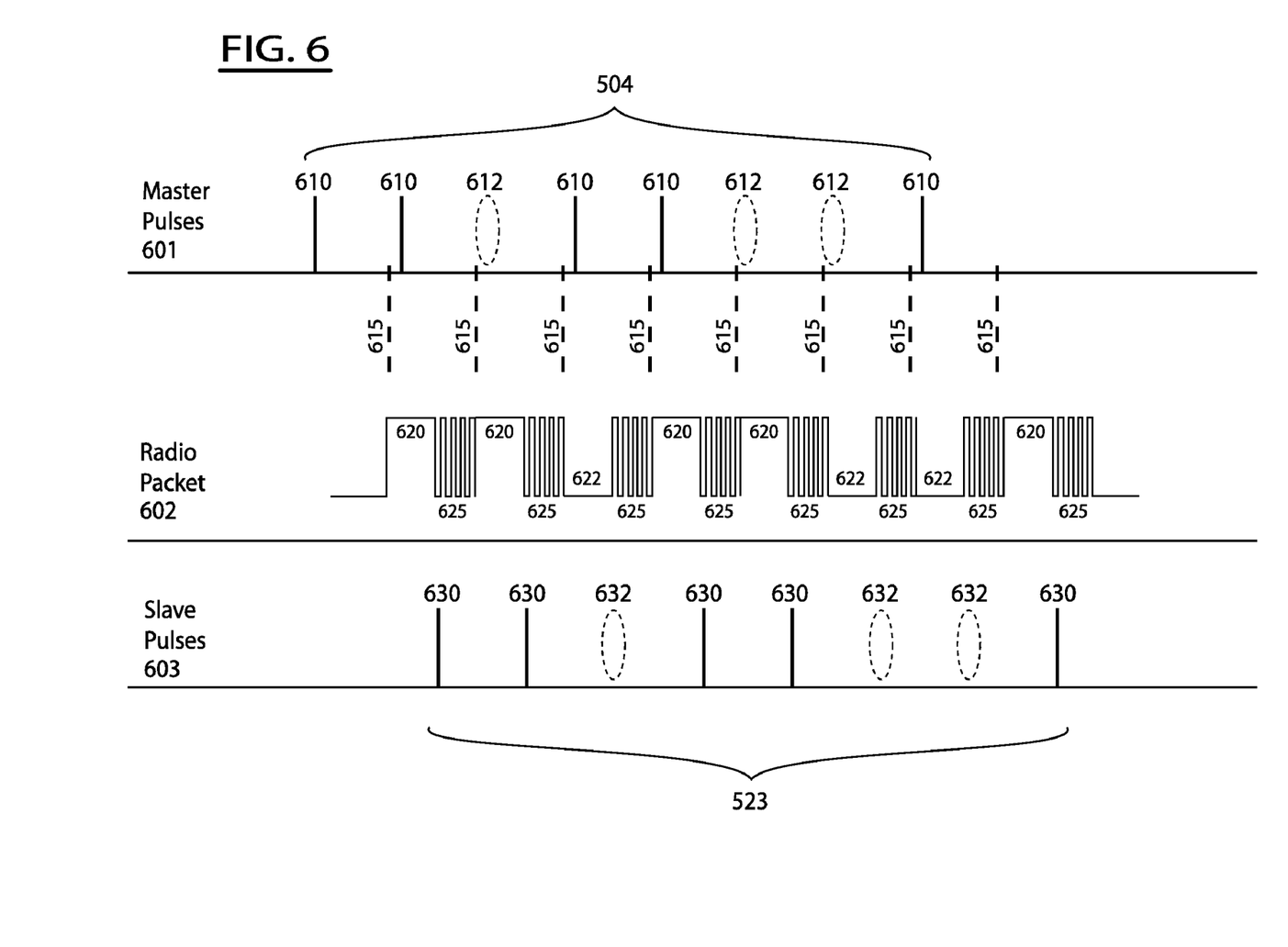
FIG. 6 representatively illustrates a more detailed structure of a radio packet representing signals from a master flash device.
Figure 7:
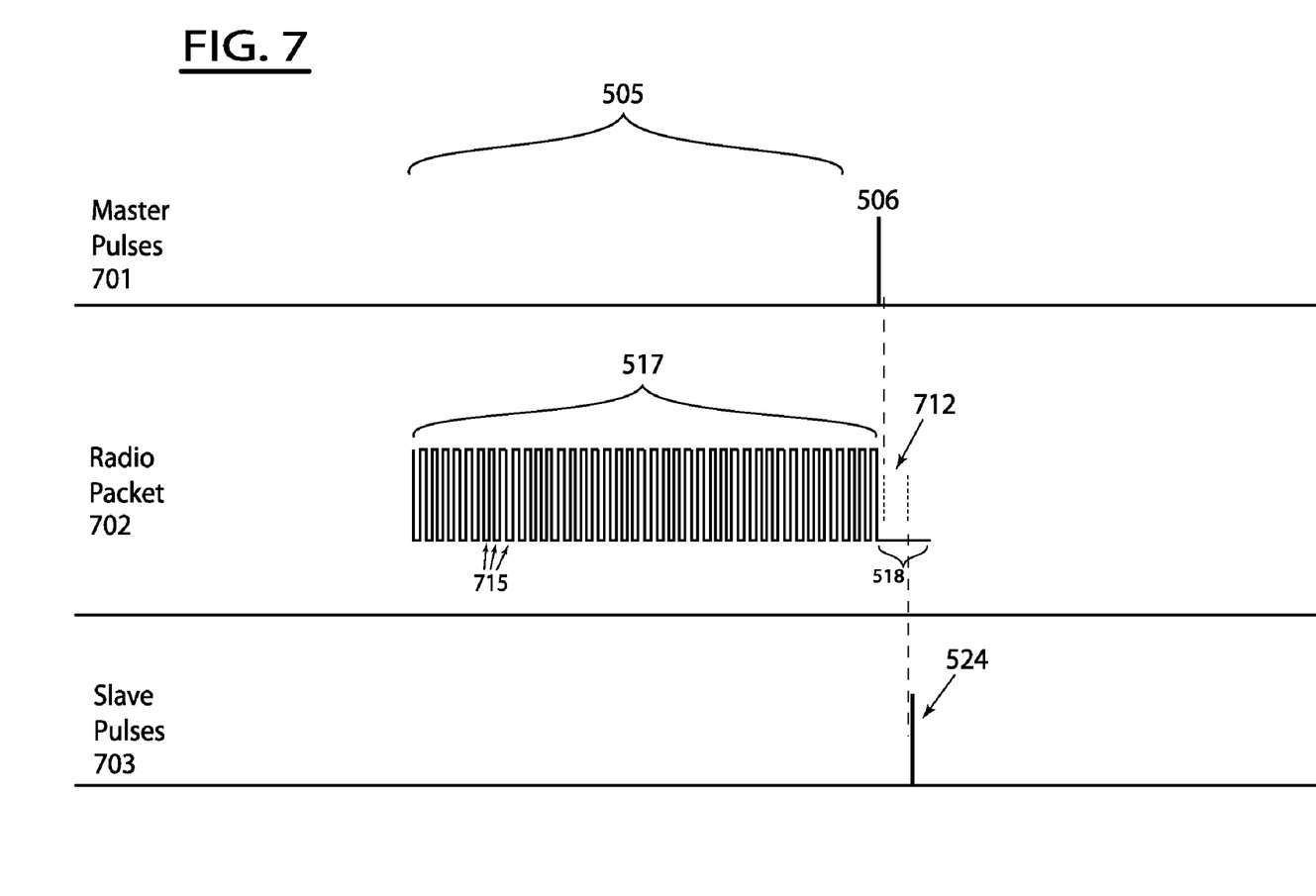
FIG. 7 representatively illustrates a more detailed structure of a radio packet prior to and an indication of a trigger pulse.

Turning now to FIG. 5, FIG. 6, and FIG. 7, the following discussion may describe various methods by which the present invention may achieve the functionality of transmitting radio signals 105 which may be representative of a pulsed light signal 103 wherein a radio transmitter 302 may transmit radio signals 105 substantially during the time in which a master device 102 may be producing pulsed light signals 103, and wherein a radio transmitter 302 may not substantially transmit radio signals 105 during the time between sequences of pulsed light signals 103, this process may be referred to as "intermittent transmission".

Turning now to FIG. 5, a method of transmitting radio signals representative of pulses of light 103 may be illustrated and described as follows. Line 501 may illustrate a sequence of pulses of light 103 which may be broken up into short groups of pulses 502, 504 separated by periods of time between groups 503, 505. A group of pulses 502, 504 may be described as follows. A master device 102 may communicate light pulses 103 which may comprise a binary representation of various data which may be commands to which a slave device 201 may be responsive wherein the various data or commands may be split into one or more data bytes which may be comprised of binary bits which may be represented by short groups of pulses 502, 504. A data byte, for example 502, may comprise a first pulse which may be used to indicate a command channel number and may also synchronize a timing clock of a slave device 201 to begin reading individual binary bits (which may be represented each by an individual pulse or lack of a pulse at a predictable timing interval) of a data byte at regular intervals. For example, a data byte 502 may comprise a first pulse which may not indicate a data but may indicate a starting point to clock in a subsequent data byte. A clock may start of a slave device 201 such that every 100 microseconds a slave device 201 checks to see if a pulse of light was received via a light sensing element 204, and if a pulse was received, the data byte may shift in a binary 1, and if no pulse was received, the data byte may shift in a binary 0. Thus, eight intervals may follow a first pulse wherein eight binary bits are shifted in which together may comprise an 8-bit binary command to which a slave device 201 may be responsive. Binary commands may not necessarily be eight bits in length as some slave devices 201 may be responsive to binary commands having fewer or greater than eight bits.

Each byte 502, 504 may be separated by an interval of time 503. Following a last data byte 504, a second interval of time 505 may pass before a final single pulse 506 is produced. The final pulse 506 may represent a synchronization event which may cause a slave device 201 to emit a burst of light substantially immediately following a final pulse 506 which may be termed a "trigger pulse". Groups of pulses 502, 504 which may comprise a binary command may be termed "pulsed data byte(s)". The amount of light and/or the characteristic of light emitted by a slave device 201 substantially immediately following the reception of a trigger pulse 506 may be representative or controlled or commanded by a binary command comprised within one or more pulsed data bytes which may have been transmitted prior to a trigger pulse 506.

Ideally, a radio transmitter 302 would be able to immediately begin transmitting radio signals substantially immediately following a very first pulse of a first pulsed data byte 502. In actual application however, this may not be possible or may not be desired. It may be common practice and best engineering practice to cause a radio transmitter 302 to begin transmitting a radio signal as a radio packet which may first comprise a preamble which may be used to synchronize a symbol demodulator of a radio receiver 402 prior to transmitting live "payload" data of a radio packet. A preamble may also be followed by a data qualifier, channel identifier, or other binary bits or bytes which may comprise an overhead process (and may be termed "packet overhead") of a radio transmission and may not contain any actual live "payload" data of a radio packet. This process of sending a preamble and other overhead data may be described in the data sheet publication SWRS061E provided for the CC1101 radio module available commercially from Texas Instruments, Inc, included in this disclosure in its entirety for reference.

A camera (not pictured) which may be coupled to a master device 102 may enable a light metering system substantially exactly following the time at which a trigger pulse 506 is produced by a master device 102. It is considered that a sequence of pulsed data bytes 502, 504, and trigger pulse 506 could simply be buffered as signals or digital or binary data via an MCU 301 and transmitted via a radio transmitter 302 and reproduced as light pulses 407 in substantially identical timing. As a radio transmitter 302 may first transmit a packet overhead, any reproduced light pulses 407 may be delayed by the interval of time approximately equal to the interval of time required to transmit a packet overhead. This delay may cause a reproduced trigger pulse 524 to be emitted by a light element 403 a substantial interval of time following the time at which a trigger pulse 506 was emitted. This may result in the slave device 201 emitting light as expected, except the emission of light may be substantially after a light meter of a camera was made active to measure the expected emission of light, or an emission of light may be produced substantially following the point in time at which a camera shutter was open for acquiring an image which may have been expected to be illuminated by an emission of light from a slave device 201.

In accordance with an exemplary method of the present invention, the above discussed delay of trigger pulse 524 which may be caused by the delay of a packet overhead may be addressed and solved as follows. In an exemplary implementation of the present invention, a slave device 201 may be responsive to a command or commands which may be comprised within pulsed data bytes 521 and 523 as long as the timing intervals between the individual data bits (which may be for example, 100 microseconds) is maintained substantially equal to the timing intervals between the individual data bits of pulsed data bytes 502, and 504 respectively. Moreover, if the time interval 503 between pulsed data bytes 502 and 504 may be reduced to a shorter interval such that if pulsed data bytes 502 and 504 are representatively reproduced as pulsed data bytes 521 and 523 but having a shorter time interval 522 compared to the original time interval 503, the slave device 201 may still operate as expected responsive to the binary command which may have been comprised within pulsed data bytes 502 and 504.

Moreover, it may not be substantially important that pulsed data byte 521 be created substantially in real time with pulsed data byte 502 and similarly, pulsed data byte 523 may not necessarily need to be created substantially in real time with pulsed data byte 504. It may only be substantially important that trigger pulse 524 be created as shortly following the observance of trigger pulse 506 as possible such that an activation of an emission of light from slave device 201 be created substantially shortly following an activation pulse 506 which may correspond to a point in time at which a light meter of a camera may be active to observe said emission of light from slave device 201, or a point in time at which a shutter of a camera may be open or active, etc.

It may be possible therefore to adjust for a delay introduced by a packet overhead using a method as follows. Line 501 of FIG. 5 may indicate a sequence of light pulses which may correspond to light pulses 103 which may be produced by a master device 102. The light pulses may comprise a plurality of pulsed data bytes 502 and 504, separated by a time interval 503, and wherein a time interval 505 may be characteristically longer than a time interval 503 and wherein following a time interval 505 a single light pulse 506 may be generated indicating a point in time at which a slave device 201 should activate and emit light. Line 502 of FIG. 5 may indicate various portions of a radio transmission which may be emitted by a radio transmitter 302 which may comprise a radio packet.

At a time substantially preceding pulsed data packet 502, a radio transmitter may not substantially emit radio signals 511. Upon an observance of the first pulse of a pulsed data packet 502, an MCU 301 may begin to buffer or store the binary bits which may comprise pulsed data packet 502 while at a similar time or a time as shortly following as possible, an MCU 301 may communicate with a radio transmitter 302 via SPI interface 305 or I/O lines 306 to begin emitting a packet overhead of a radio packet which may be illustrated by packet segment 512. Once a packet overhead 512 is transmitted, radio transmitter 302 may begin transmitting a data 513 which may be representative of pulsed data byte 502 which may have been buffered by MCU 301. A process of transmitting radio signals representative of a pulsed data byte 502 that has been at least partially buffered by a microprocessor may comprise buffering a portion of pulsed data byte 502 by a microprocessor, or may also in addition to or in place of, may comprise buffering a portion of pulsed data byte 502 in a first-in-first-out ("FIFO") buffer of a radio transmitter 302. A short time interval 514 may be filled with filler data to allow a short interval of time 522 to pass. As packet segment 513 is transmitted, or as a packet overhead 512 is being transmitted, an MCU 301 may begin to observe a subsequent pulsed data byte 504 and begin to buffer the pulsed data byte 504. When filler data 514 has been transmitted, a radio transmitter 302 may begin to transmit packet segment 515 which may be representative of pulsed data byte 504. It is possible that a packet segment representative of a given pulsed data byte may begin to be transmitted by a radio transmitter 302 before the entire given pulsed data byte has been observed by an MCU 301. A packet segment 516 may comprise more filler data which may be transmitted for an interval of time equal to or greater than the maximum interval of time expected to exist between two pulsed data bytes, for example, the interval of time 503.

In this way, it may be possible to transmit an unknown number of pulsed data bytes, wherein a subsequent pulsed data byte is expected to being within a maximum interval of time following a preceding pulsed data byte. If the interval of time following a given pulsed data byte (for example 505) exceeds the maximum interval of time during which a subsequent pulsed data byte may be expected (for example 503), it may be assumed that no further pulsed data bytes are likely to be produced, and rather, a single pulse 506 which may be a trigger pulse may be the next pulse expected to be observed. Once a maximum interval of time following a given pulsed data byte has elapsed without observing the start of a subsequent pulsed data byte ("end of pulsed data bytes"), a radio transmitter 302 may prepare to send an indication of a trigger pulse 506 in substantially real time ("preparation for trigger pulse") as follows. While an MCU 301 is awaiting an end of pulsed data bytes, a filler data 516 may comprise a portion of a radio packet, and when upon a preparation for trigger pulse is reached, the MCU 301 may cause a radio module 302 to begin transmitting a radio signal carrier which is rapidly modulated such that the digital high/low output of a radio receiver 402 is rapidly alternated between a high and low state, and when upon observing a trigger pulse 506 by sensing element 303, 104, an MCU 301 may cause a radio module 302 to stop modulating a radio signal carrier such that the digital high/low output of a radio receiver 402 is no longer alternated between a high or low state but rather is forced to a high state or a low state for a period of time. An MCU 401 when upon observing that a digital high/low output of a radio receiver 402 has not changed state for a short period of time 712, a trigger pulse 524 may be caused to be emitted from a light element 403. An illustration of a preparation for trigger pulse may be depicted in FIG. 7 as described. Line 701 may illustrate an interval of time 505 during which a rapidly alternating 715 digital output 5 of a radio receiver 402 as observed by an MCU 401 may be illustrated. As long as the output is alternated between high and low 517, no trigger pulse 524 is generated. This may be accomplished by setting a timer of an MCU 401 which may be reset each time an interrupt is triggered, wherein the interrupt may be triggered by each rising edge or falling edge of the alternating output 715, 517, of radio receiver 402. Said alternating output may be observed on I/O lines 406. When the stated timer has timed out (which may be as a result of no transition of alternating output has been observed for a period of time 712), the time-out of the timer may generate another interrupt of an MCU 401 which may cause a trigger pulse 524 to be emitted by light element 403.

Line 503 of FIG. 5 may illustrate pulses of light caused by MCU 401 to be emitted from light element 403. When radio packet segment 513 is observed by radio receiver 402, an MCU 401 may begin to cause a representative pulsed data byte 521 to be emitted from light element 403. Similarly, whereupon observing radio packet segment 515 received by a radio receiver 402, an MCU 401 may begin to cause a representative pulsed data byte 523 to be emitted from light element 403. It may be desirable to cause a pulsed data byte (for example 521) to begin being emitted from a light element 403 before an entire packet segment 513 has been received.

An exemplary pulsed data byte 504, along with a representative portion of a radio packet 515, along with a representative pulsed data byte 523 may be illustrated in FIG. 6 and described as follows. Master pulses (line 601) may be observed via sensing element 303 by MCU 301 by allowing a sensing element 303 to cause an interrupt flag to be set of an MCU 301 each time a pulse is observed. A regular interval ("pulsed bit interval") 615 may be characteristic of an interval of time expected to elapse between the emission of individual binary bits which may comprise a pulsed data byte 504, for example, a pulsed bit interval 615 may be approximately 100 microseconds. At each pulsed bit interval 615, an MCU 301 may check to see if an interrupt flag has been set which may have been set by the observance of a pulse 610 from sensing element 303. A pulsed data byte 504 may comprise pulses 610, and non-pulses 612 (periods of time where a pulse may have been observed to indicate a binary 1, but no pulse was observed, which may indicate a binary 0).

A radio packet segment 515 may be illustrated by line 602 of FIG. 6. Each 100 microsecond interval may comprise two 8-bit bytes. A data rate of approximately 160,000 bits per second (160 Kbps) may achieve this timing. The first 8 bit byte of each pulsed bit interval may comprise either hexadecimal data 0xFF (620) if a pulse 610 was observed during the pulsed bit interval 615, or a hexadecimal data of 0x00 (622) if a non-pulse 612 was observed during the pulsed bit interval 615. The second 8 bit byte 625 of each pulsed bit interval may comprise an alternating sequence of binary 1's and 0's, for example hexadecimal values 0x55 or 0xAA. An alternating sequence of binary 1's and 0's as hexadecimal values 0x55 or 0xAA (625) may be inserted to the packet segment to cause a demodulation clock or symbol timing clock of a radio receiver 402 to remain substantially synchronized with a modulation clock or symbol timing clock of a radio transmitter 302. If a long sequence of pulses is observed, or if a long sequence of non-pulses are observed, it is possible that the demodulation clock or symbol timing clock of a radio receiver 402 may not observe a state change of the received radio signal for a relatively long period of time which may cause the demodulation clock of the radio receiver to drift out of time with the modulation clock of the radio transmitter which could result in errors of the received radio signal. It may be for this reason that an alternating sequence of binary 1's and 0's (625) may be inserted between each byte indicating a pulse 620 or a non-pulse 622.

As a pulse 610 may generate a transmitted radio byte 620 of 0xFF, and a non-pulse 612 may generate a transmitted radio byte 622 of 0x00, it may be assumed that whereupon an MCU 401 reads a received radio byte 620 or 622 from a radio receiver 402 that the received radio byte will be exactly equal to 0xFF or 0x00 and no other value. As a radio byte 620 may comprise a 0xFF which may comprise a binary sequence of eight 1's, and a radio byte 622 may comprise a 0x00 which may comprise a binary sequence of eight 0's, it may be possible to perform a basic error check which may allow a limited error of the received radio byte to be corrected and still of use as follows. A received radio byte may be evaluated by a software of MCU 401, and if it is found to comprise four or more binary 1 bits, it may be assumed that the received radio byte is 0xFF and interpreted as originating from a pulse 610. Similarly, if a received radio byte is evaluated by a software of an MCU 401 and it is found to comprise less than four binary 1 bits, it may be assumed that the received radio byte is 0x00 and interpreted as originating from a non-pulse 612.

As an MCU 401 evaluates a received radio byte 620 or 622, if the received radio byte is interpreted as 0xFF, a pulse 630 may be emitted from a light element 403, and if an MCU 401 evaluates a received radio byte 620 or 622, if the received radio byte is interpreted as 0x00, no pulse 632 may be emitted by a light element 403.

It is considered that a timing clock of an MCU 301 may be used to time pulsed bit intervals 615, and whereupon observing a pulse 610 or a non-pulse 612, that a representative data byte 620 or 622 may be loaded into a first-in-first-out ("FIFO") register of a radio transmitter 302 via a SPI interface 306 and may be immediately followed by a filler data byte 625. Similarly, it is considered that a timing clock of an MCU 402 may be used to time the intervals at which various portions of a packet segment may be expected to arrive or be received by a radio receiver 402. Received packet segments or data bytes may be automatically stored in a FIFO register of a radio receiver 402 prior to being read out or queried by an MCU 401.

At the completion of receiving a radio packet (for example, the radio packet illustrated in line 602 of FIG. 6) which may be indicated by an interval of time 712, a radio transmitter 402 may be caused by an MCU 401 to stop transmitting radio signals 105 as indicated by 519.

As pulsed data bytes, for example 521 and 523, may be emitted by a light element 403 some period of time following the emission of pulsed data bytes, for example 502 and 504, it may be possible that a light sensor 204 of a slave device 201 is able to perceive both the coded light pulses 103 from a master device 102 and coded light pulses 407 from a receiver unit 202, wherein the respective coded light pulses arrive slightly out of time with one another. This may cause a slave device 201 to fail to operate as expected. This may be avoided by preventing a light sensor 204 of a slave device 201 from being perceptible of light pulses 103 from a master device 102 and rather only being aware of light pulses 407 from a receiver unit 202. This may be carried out by placing a material such that light pulses 103 are not allowed to reach a light sensor 204.

In an alternate exemplary embodiment of the present invention, it is considered that a receiver unit 202 of the present invention may be able to receive radio signals which may not have been transmitted from a transmitter unit 101 of the present invention. Rather, a receiver unit 202 of the present invention may be able to receive radio signals from a different transmitter which may not have sensed pulses of light 103 from a master device wherein the received radio signals from the a different transmitter may comprise a radio packet or portions of a radio packet that may cause a receiver unit 202 of the present invention to emit pulses of light 407 of a predictable pattern. It may be possible for a different transmitter unit to transmit signals comprising pulsed data bytes from a stored memory such that a given sequence of transmitted pulsed data bytes may comprise a specific binary command or binary commands to which a slave device 201 may be responsive. For example, a transmitter unit may have various binary commands stored in a memory such that in response to various input (which may be from a user, from a signal from a camera or another device, etc) a transmitter unit may be able to transmit a radio packet comprising a given stored binary command or commands such that a receiver unit 202 of the present invention may cause pulses of light 407 representative of the stored binary command or commands to be emitted perceptible to a slave device 201 which may be responsive to perform a useful function. The a different transmitter unit may transmit radio signals having a substantially similar characteristic as those radio signals which may be transmitted by a transmitter unit 101 of the present invention.

In yet another exemplary embodiment of the present invention, it is considered that a receiver unit 202 of the present invention may have fitted an electrical connection, electrical contacts, a port or a data port or any combination or sequence thereof ("data port") whereby a receiver unit 202 may be able to send an electrical signal or electrical signals to another device or receive an electrical signal or signals from another device. For example, a receiver unit 202 having a data port may be able to send signals to or from a flash device via an electrical connection to a hot shoe connector of the flash device, a universal serial bus ("USB") connector of a flash device or the data pins or a connector or a data port accessible internally or externally of a flash device. A data port may transmit signals to a flash device in response to receiving a radio packet or portion of a radio packet by a radio receiver 402 such that the flash device may carry out a useful or predictable function which may be indicated by the radio packet or portion of a radio packet received by a radio receiver 402.

In yet another exemplary embodiment of the present invention, it is considered that a radio transmitter 302 may transmit a radio signal or a radio carrier in response to a pulse of light 103 being perceived by a sensing element 303, and to stop transmitting a radio signal or radio carrier prior to a subsequent pulse of light 103 being made perceptible to a sensing element 303. For example, a radio transmitter 302 may transmit a radio signal or a radio carrier for a period of time following each pulse of light or following each signal from sensing element 303, and may stop transmitting a radio signal or radio carrier prior to a time when a subsequent pulse of light 103 or signal from a sensing element 303 is expected. It may be a requirement that a radio signal may be caused to be transmitted from a radio transmitter 302 during a pulsed bit interval 615, and may be caused to stop being transmitted prior to a subsequent bit interval 615. It may also be a requirement that a radio receiver 402 be able to perceive the transmitted radio signal from a radio transmitter 302 and to cause an MCU 401 to cause a light element 403 to emit a pulse of light within a short period of time following a pulse of light 103. It may also be a requirement that a radio receiver 302 be able to perceive the absence of a transmitted radio signal prior to the occurrence of a subsequent pulse of light 103 being received by a sensing element 303, and it may be a requirement that a radio receiver 302 be able to perceive the absence of a transmitted radio signal from a radio transmitter 302 prior to a radio transmitter 302 transmitting a subsequent radio signal or radio carrier. An MCU 401 of a receiver unit may cause a light element 403 to emit a single pulse of light in response to receiving an indication from a radio receiver 402 that a radio signal or radio carrier is present.

SUMMARY

In the foregoing specification, the invention has been described with reference to specific exemplary embodiments. Various modifications and changes may be made, however, without departing from the scope of the present invention as set forth in the claims. The specification and figures may be illustrative, rather than restrictive, and modifications may be intended to be included within the scope of the present invention. Accordingly, the scope of the invention should be determined by the claims and their legal equivalents rather than by merely the examples described.

For example, the steps recited in any method or process claims may be executed in any order and may be not limited to the specific order presented in the claims. Additionally, the components and/or elements recited in any apparatus claims may be assembled or otherwise operationally configured in a variety of permutations and may be accordingly not limited to the specific configuration recited in the claims.

Benefits, other advantages and solutions to problems have been described above with regard to particular embodiments; however, any benefit, advantage, solution to a problem or any element that may cause any particular benefit, advantage or solution to occur or to become more pronounced may be not to be construed as critical, required or essential features or components of any or all the claims.

As used herein, the terms "comprise", "comprises", "comprising", "have", "has", "having", "including", "includes", "employs", "employing" or any variation thereof, may be intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What may be claimed may be:

1. A method of wirelessly relaying coded pulses of light from at least one first flash device by the intermittent transmission of radio signals, the method comprising:

allowing a sensing element of a first radio communication device to become perceptible of a phenomenon associated with the emission of at least one pulse of light by an at least one first flash device;

allowing an at least one first microprocessor of a first radio communication device to become perceptible of a sensing element;

allowing a radio transmitter having an antenna element to communicate signals with an at least first microprocessor;

an at least first microprocessor causing a radio transmitter to begin transmitting radio signals upon receiving at least one signal from a sensing element;

an at least first microprocessor causing a radio transmitter to stop transmitting radio signals following a process of receiving at least one signal from a sensing element.

2. The method of claim 1, wherein the process of receiving the at least one signal from a sensing element comprises receiving at least a first pulse of light of a pulsed data byte.

3. The method of claim 2 wherein the process of receiving at least one signal from a sensing element comprises receiving a plurality of pulsed data bytes.

4. The method of claim 3 wherein upon the completion of a first characteristic interval of time a preparation for trigger pulse is performed.

5. The method of claim 1 wherein a packet overhead is transmitted from a radio transmitter in response to receiving the at least one signal from a sensing element.

6. The method of claim 5 wherein a pulsed data byte is at least partially buffered by an at least first microprocessor during the transmission of a packet overhead.

7. The method of claim 5 wherein the interval of time required to transmit a packet overhead is subtracted from the interval of time between the transmission of radio signals representative of two or more pulsed data bytes.

8. The method of claim 5 wherein a packet segment representative of a pulsed data byte is transmitted from a radio transmitter following the transmission of a packet overhead.

9. The method of claim 8 wherein a packet segment comprises a data representative of at least a pulse or a non-pulse of light.

10. The method of claim 9 wherein a packet segment comprises a filler data between at least two portions of data representative of at least a pulse or a non-pulse of light.

11. A method of wirelessly relaying a sequence of binary commands and a terminal trigger command communicated by a flash device, wherein binary commands are separated by a time interval no greater than a predetermined duration, and wherein the trigger command is characterized by following a binary command by a time interval greater than the predetermined duration, the method comprising:

detecting, by a first radio communication device, a sequence of binary commands emitted by the flash device;

formatting a wireless transmission to include a corresponding sequence of data segments each having the same duration of the binary command represented thereby, and separated by filler data segments, at least one of which has a shorter duration than the corresponding time interval separating subsequent binary commands; and transmitting, by the first radio communication device, the wireless transmission after a time delay in which the wireless transmission is at least partially formatted.

12. The method of claim 11, wherein the time delay is offset by at least some of the filler data segments being of shorter duration than the respective time intervals separating the binary commands.

13. The method of claim 11, further comprising:
  detecting, by the first radio communication device, after initiating the wireless transmission, a terminal trigger command following the sequence of binary commands; and
  formatting, while transmitting, the wireless transmission to include a data segment representing the trigger command, separated from the data segment corresponding to a final binary command in the sequence by a filler data segment having a longer duration than the predetermined duration but having a shorter duration than the time interval separating the trigger command from the final binary command.

14. The method of claim 13, further comprising terminating the wireless transmission after the data segment representing the trigger command is transmitted.

15. The method of claim 11, wherein the wireless transmission is formatted as a radio packet, and wherein the data segments are radio packet segments.

16. The method of claim 15, wherein the delay is caused by buffering at least a portion of the detected sequence of binary commands.

17. The method of claim 11, wherein formatting a wireless transmission at least partially overlaps the first radio communication device detecting the sequence of binary commands.

18. The method of claim 17, wherein transmitting the wireless transmission at least partially overlaps formatting the wireless transmission.

19. The method of claim 18, wherein the transmission of at least one data segment of the wireless transmission is begun prior to the detection of the entire binary command to which it corresponds.

20. A method of wirelessly relaying sequences of optical commands emitted by two or more flash devices, wherein each sequence of optical commands includes a series of one or more binary commands followed by a terminal trigger command, and wherein the emissions are initiated at different times, the method comprising:
  detecting, by a first radio communication device, a sequence of optical commands emitted by a first flash device;
  detecting, by a second radio communication device, a sequence of optical commands emitted by a second flash device that are initiated after the initiation of the sequence emitted by the first flash device;
  formatting first and second wireless transmissions to each include, respectively, a corresponding sequence of data segments, wherein each data segment has the same duration of the optical command represented thereby;
  transmitting, by the first and second wireless communication devices, respectively, the first and second wireless transmissions such that the data segments representing the trigger commands are each transmitted substantially in real time with the emission of the trigger commands by the first and second flash devices; and
  terminating each wireless transmission upon transmitting the data segment corresponding to the terminal trigger command;
  wherein the second wireless transmission is transmitted following the termination of the first wireless transmission.

\* \* \* \* \*